Dec. 2, 1924.

M. F. CARR

STUD

Filed Nov. 18, 1922

1,517,705

Inventor:
Moses F. Carr,
by Emery, Booth, Janney & Varney
Attys.

Patented Dec. 2, 1924.

1,517,705

UNITED STATES PATENT OFFICE.

MOSES F. CARR, OF LEXINGTON, MASSACHUSETTS, ASSIGNOR TO CARR FASTENER COMPANY, OF CAMBRIDGE, MASSACHUSETTS, A CORPORATION OF MAINE.

STUD.

Application filed November 18, 1922. Serial No. 601,851.

*To all whom it may concern:*

Be it known that I, MOSES F. CARR, a citizen of the United States, and a resident of Lexington, in the county of Middlesex, State of Massachusetts, have invented an Improvement in Studs, of which the following description, in connection with the accompanying drawings, is a specification, like characters on the drawings representing like parts.

This invention pertains to improvements in studs, and more particularly, though not exclusively, to improvements in that type of stud ordinarily used in connection with snap fasteners on automobiles. It is among the objects of my invention to provide a stud which will form a satisfactory joint with a plane surface against which the stud is drawn by a screw or the like.

In the drawings, which show a preferred form of one embodiment of my invention:

Figure 1:
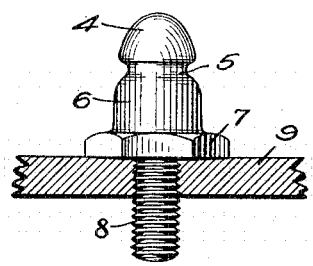
Figure 1 is a side elevation of a preferred form of stud entered in a sheet metal carrying part, which is shown in section.
Figure 2:
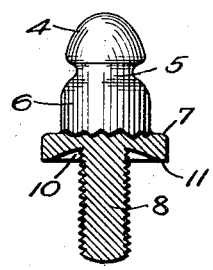
Fig. 2 is a side elevation of the stud illustrated in Fig. 1, being partly in section.
Figure 3:
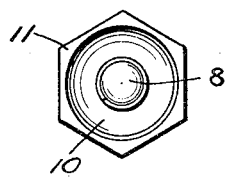
Fig. 3 is an end elevation of the preferred form of stud shown in Fig. 2, as viewed from the bottom thereof.

Referring to the drawings and to the preferred form of my invention selected for illustrative purposes, I have shown a stud cut from a single piece of metal by a screw machine or otherwise, and including a head 4, neck 5, shank 6, polygonal base portion 7 and screw 8. In Fig. 1, the stud is shown engaged with a sheet metal plate 9, which may be a portion of an automobile body.

I have found that in studs manufactured by a screw machine or otherwise and generally of the type here under consideration, considerable difficulty has at times been experienced by reason of the fact that the men assembling the studs with automobile parts or the like will not screw the studs into close engagement with the sheet metal or other parts to which they are attached, but will leave the stud base spaced somewhat from the surface of the carrying part, thereby rendering the attachment unsightly and sometimes resulting in loss of the stud. I have found that the reason for this is because the bearing of the bottom of the stud base against the side of the car may not always be even, and because the threads of the screw may be somewhat imperfect adjacent the plane of the bottom of the base of the stud.

I have found that I can remedy these defects and also reduce greatly the likelihood of any chipping or scarring of the enameled or otherwise finished surface of the carrying part, by somewhat hollowing the base of the stud while providing relatively limited flat surfaces adjacent the edge thereof to contact with the surface of the sheet metal or other carrying part. By this expedient, I not only provide a desirable limiting bearing surface, reducing friction and likelihood of incomplete attachment arising from premature partial engagement of the base with the surface of the carrying part, but I also provide an opportunity for extending the threads on the screw somewhat beyond the plane of the base of the stud so that a full thread is more likely to be provided throughout that portion of the screw which is utilized.

The recess herein shown at 10 is preferably symmetrical, conical and tapered or frusto-conical, being of a maximum diameter slightly less than the minor diameter of the polygonal base, and thereby permitting relatively flat surfaces 11 at the recess side of the base, which surfaces 11 may abut against the adjacent surface of the stud-carrying part.

My invention is best defined in the following claims.

1. A one-piece separable fastener stud including a head, a neck, a shank, a polygonal base and a threaded portion, said base recessed and said threaded portion extending at each side of the plane of the bottom of said base.

2. A separable fastener stud formed in one piece and presenting a head portion, a base portion and a screw, said base recessed and said screw having threads terminating within said base.

3. A separable fastener stud formed in one piece and presenting a head, an underlying base and a screw, said base symmetrically recessed adjacent the point of junction between said base and screw, and the threads of said screw terminating within said base.

4. A separable fastener stud presenting a head, an underlying base and a screw, said base recessed at that side thereof adjacent said screw while presenting adjacent its periphery relatively flat portions for engagement with the surface of the stud-carrying part, said screw having threads extending at each side of the plane of said flat portions.

In testimony whereof, I have signed my name to this specification.

MOSES F. CARR.